US012797823B2

(12) United States Patent
Ham et al.

(10) Patent No.: US 12,797,823 B2
(45) Date of Patent: Nov. 17, 2026

(54) BIODEGRADABLE SUPER ABSORBENT POLYMER AND PREPARATION METHOD THEREOF

(71) Applicant: LG Chem, Ltd., Seoul (KR)

(72) Inventors: Kyungrok Ham, Daejeon (KR); Beomshin Cho, Daejeon (KR); Soonhee Kang, Daejeon (KR); Hyungsam Choi, Daejeon (KR); Haesung Yun, Daejeon (KR)

(73) Assignee: LG Chem, Ltd., Seoul (KR)

( * ) Notice: Subject to any disclaimer, the term of this patent is extended or adjusted under 35 U.S.C. 154(b) by 440 days.

(21) Appl. No.: 18/574,462

(22) PCT Filed: Jun. 30, 2022

(86) PCT No.: PCT/KR2022/009386
§ 371 (c)(1),
(2) Date: Dec. 27, 2023

(87) PCT Pub. No.: WO2023/282534
PCT Pub. Date: Jan. 12, 2023

(65) Prior Publication Data

US 2024/0286114 A1 Aug. 29, 2024

(30) Foreign Application Priority Data

Jul. 9, 2021 (KR) ........................ 10-2021-0090425
Jun. 29, 2022 (KR) ........................ 10-2022-0079572

(51) Int. Cl.

| | |
|---|---|
| ***B01J 20/26*** | (2006.01) |
| ***C08K 5/1515*** | (2006.01) |
| ***C08K 5/1539*** | (2006.01) |
| ***C08K 5/1545*** | (2006.01) |
| ***C08L 3/04*** | (2006.01) |
| ***C08L 5/08*** | (2006.01) |

(52) U.S. Cl.
CPC ........... *B01J 20/262* (2013.01); *B01J 20/267* (2013.01); *C08K 5/1515* (2013.01); *C08K 5/1539* (2013.01); *C08K 5/1545* (2013.01); *C08L 3/04* (2013.01); *C08L 5/08* (2013.01); *B01J 2220/68* (2013.01); *C08L 2201/06* (2013.01)

(58) Field of Classification Search
CPC .... B01J 20/262; B01J 20/267; B01J 2220/68; C08K 5/1515; C08K 5/1539; C08K 5/1545; C08L 3/04; C08L 5/08; C08L 2201/06; C08L 3/06; C08B 31/006; C08B 37/003; C08B 31/04; C08J 3/075; C08J 3/24
See application file for complete search history.

(56) References Cited

U.S. PATENT DOCUMENTS

| | | | | |
|---|---|---|---|---|
| 5,789,570 | A | 8/1998 | Buchholz et al. | |
| 5,811,531 | A | 9/1998 | Iguchi et al. | |
| 6,346,263 | B1 | 2/2002 | Mercier et al. | |
| 7,407,912 | B2 * | 8/2008 | Mertens | C08B 31/006 502/404 |
| 2004/0236016 | A1 | 11/2004 | Thornton et al. | |
| 2008/0177057 | A1 | 7/2008 | Bolduc et al. | |
| 2008/0262155 | A1 | 10/2008 | Mertens et al. | |
| 2016/0222134 | A1 | 8/2016 | Sannino et al. | |
| 2021/0039068 | A1 | 2/2021 | Savich | |
| 2021/0070888 | A1 | 3/2021 | Ayoub et al. | |
| 2024/0367147 | A1 | 11/2024 | Ota et al. | |

FOREIGN PATENT DOCUMENTS

| | | | |
|---|---|---|---|
| CN | 107141519 | A | 9/2017 |
| EP | 0714913 | A1 | 6/1996 |
| EP | 0714914 | A1 | 6/1996 |
| EP | 4317193 | A1 | 2/2024 |
| JP | S56152806 | A | 11/1981 |
| JP | H06154596 | A | 6/1994 |
| JP | H08208703 | A | 8/1996 |
| JP | 2001500888 | A | 1/2001 |
| JP | 2006328346 | A | 12/2006 |
| JP | 2007222704 | A | 9/2007 |
| JP | 2012012462 | A | 1/2012 |
| JP | 2012012549 | A | 1/2012 |
| JP | 4880144 | B2 | 2/2012 |
| JP | 5632635 | B2 | 11/2014 |
| JP | 2016052973 | A | 4/2016 |
| JP | 5947768 | B2 | 7/2016 |
| JP | 2017525784 | A | 9/2017 |

(Continued)

OTHER PUBLICATIONS

Translation of JP 2012-012549 (2012).*
Modern Superabsorbent Polymer Technology (1998), p. 69-73 and 97-103.*
Extended European Search Report including Written Opinion for Application No. 22837886.5 dated Sep. 4, 2024, pp. 1-5.
Perez-Alvarez, L. et al. "Polysaccharide-Based Superabsorbent: Synthesis, Properties, and Applications," Springer Nature Switzerland AG, Jan. 2019, 39 pages.
International Search Report for PCT/KR2022/009386 mailed Oct. 12, 2022. 5 pages.
Pathak, Vaibhav et al., "Starch-based biodegradable hydrogel as seed coating for corn to improve early growth under water shortage", Journal of Applied Polymer Science, Sep. 2019, 12 pages.
Third Party Observation for application No. EP20220837886, dated Dec. 25, 2024, pp. 1-11.

*Primary Examiner* — Christina A Johnson
(74) *Attorney, Agent, or Firm* — Lerner David LLP

(57) ABSTRACT

Provided are a superabsorbent polymer exhibiting excellent biodegradability without deterioration in physical properties of the superabsorbent polymer, such as water retention capacity, absorbency under pressure, etc., and a preparation method thereof. The biodegradable superabsorbent polymer comprises a base polymer including a crosslinked polymer of a non-modified or acidic group-containing modified polysaccharides and a first crosslinking agent, wherein at least part of the base polymer is crosslinked by a second crosslinking agent, the first crosslinking agent includes a cyclic carboxylic acid anhydride, and the second crosslinking agent includes an epoxy-based compound.

19 Claims, No Drawings

(56) References Cited

FOREIGN PATENT DOCUMENTS

| | | | |
|---|---|---|---|
| KR | 100278391 | B1 | 1/2001 |
| KR | 20010105311 | A | 11/2001 |
| KR | 20170109587 | A | 9/2017 |
| KR | 20200132929 | A | 11/2020 |
| WO | 2002096953 | A1 | 12/2002 |

* cited by examiner

BIODEGRADABLE SUPER ABSORBENT POLYMER AND PREPARATION METHOD THEREOF

CROSS-REFERENCE TO RELATED APPLICATIONS

The present application is a national stage entry under 35 U.S.C. § 371 of International Application No. PCT/KR2022/009386 filed on Jun. 30, 2022, which claims priority from, Korean Patent Application Nos. 10-2021-0090425, and 10-2022-0079572, filed on Jul. 9, 2021, and Jun. 29, 2022, respectively, all the disclosures of which are incorporated by reference herein in their entirety.

TECHNICAL FIELD

The present disclosure relates to a biodegradable superabsorbent polymer exhibiting excellent biodegradability without deterioration in physical properties of the superabsorbent polymer, such as water retention capacity, absorbency under pressure, etc., and a preparation method thereof.

BACKGROUND OF ART

A superabsorbent polymer (SAP) is a synthetic polymeric material capable of absorbing moisture from 500 to 1000 times its own weight. Various manufacturers have denominated it as different names, such as SAM (Super Absorbency Material), AGM (Absorbent Gel Material), etc. Since such superabsorbent polymers started to be practically applied in sanitary products, now they have been widely used not only for hygiene products such as disposable diapers for children, etc., but also for water retaining soil products for gardening, water stop materials for the civil engineering and construction, sheets for raising seedling, fresh-keeping agents for food distribution fields, materials for poultice, electrical insulation applications or the like.

Such a superabsorbent polymer is commonly prepared after obtaining a crosslinked polymer by bulk polymerization or suspension polymerization of an acrylic acid monomer together with a crosslinking agent in the presence of a polymerization initiator. Therefore, most superabsorbent polymers have no biodegradable property, which causes environmental problems when treated as waste. Specifically, when several products to which the superabsorbent polymers are applied are buried and discarded, these superabsorbent polymers are not decomposed by bacteria or microorganisms in the ground, leading to environmental pollution.

For this reason, attempts have been made on superabsorbent polymers exhibiting excellent biodegradability by using biomass-derived materials, but it was not easy to produce biodegradable superabsorbent polymers which may be economically prepared while exhibiting overall physical properties similar to those of existing superabsorbent polymers.

Accordingly, there is a continuous demand for the development of a technology related to a superabsorbent polymer capable of exhibiting biodegradability without deterioration in the basic physical properties of the superabsorbent polymer.

DETAILED DESCRIPTION

Technical Problem

Accordingly, there are provided a superabsorbent polymer exhibiting excellent biodegradability without deterioration in physical properties of the superabsorbent polymer, such as water retention capacity, absorbency under pressure, etc., and a preparation method thereof.

Technical Solution

According to one embodiment of the present invention, there is provided a biodegradable superabsorbent polymer including a base polymer including a crosslinked polymer of non-modified or acidic group-containing modified polysaccharides and a first crosslinking agent, wherein at least part of the base polymer is crosslinked by a second crosslinking agent, the first crosslinking agent includes a cyclic carboxylic acid anhydride, and the second crosslinking agent includes an epoxy-based compound.

According to another embodiment of the present invention, there is provided a method of preparing a biodegradable superabsorbent polymer, the method including the steps of: preparing a crosslinked polymer by crosslinking non-modified or acidic group-containing modified polysaccharides in the presence of a first crosslinking agent (step 1);

preparing a base polymer by drying and pulverizing the crosslinked polymer (step 2); and crosslinking at least part of the base polymer in the presence of a second crosslinking agent (step 3), wherein the first crosslinking agent includes a cyclic carboxylic acid anhydride, and the second crosslinking agent includes an epoxy-based compound.

Furthermore, according to still another embodiment of the present invention, there is provided an article including the biodegradable superabsorbent polymer.

Advantageous Effects

A biodegradable superabsorbent polymer of the present disclosure may exhibit excellent biodegradability by including a crosslinked polymer, in which polysaccharides are crosslinked by a crosslinking agent, while exhibiting no deterioration in overall physical properties of the superabsorbent polymer, such as water retention capacity, absorbency under pressure, etc., by further including a crosslinked layer, in which at least part of the crosslinked polymer is crosslinked by a second crosslinking agent.

Accordingly, the biodegradable superabsorbent polymer may be applied to a variety of hygiene products, and may also cause no environmental problems when treated as waste.

DETAILED DESCRIPTION OF THE EMBODIMENTS

The terms used in this description are just for explaining exemplary embodiments and it is not intended to restrict the present invention. The singular expression may include the plural expression unless it is differently expressed contextually. It must be understood that the term "include", "equip", or "have" in the present description is only used for designating the existence of characteristics taken effect, steps, components, or combinations thereof, and do not exclude the existence or the possibility of addition of one or more different characteristics, steps, components, or combinations thereof beforehand.

Further, in the present disclosure, when a layer or an element is referred to as being "on" or "above" another layer or element, it means that each layer or element is directly formed on the layers or elements, or other layers or elements may be formed between the layers, subjects, or substrates.

The present invention may be variously modified and have various forms, and specific exemplary embodiments are exemplified and explained in detail in the following description. However, it is not intended to limit the present invention to the specific exemplary embodiments and it must be understood that the present invention includes every modifications, equivalents, or replacements included in the spirit and technical scope of the present invention.

Further, technical terms used in this description are just for explaining specific exemplary embodiments and it is not intended to restrict the present invention. The singular expression used herein may include the plural expression unless it is differently expressed contextually.

Meanwhile, as used herein, the term "(meth)acrylate" includes both of acrylate and methacrylate.

As used herein, the term "crosslinked polymer" refers to a polymerized state of a plurality of polysaccharides crosslinked by a crosslinking agent, and may encompass those of all water content ranges or particle size ranges.

Further, as used herein, the term "superabsorbent polymer" refers to, depending on the context, a crosslinked polymer, in which a plurality of polysaccharides are crosslinking-polymerized by a crosslinking agent, or a base polymer in the form of powder consisting of superabsorbent polymer particles obtained by pulverizing the crosslinked polymer, or is used to encompass those made suitable for commercialization by performing an additional process on the crosslinked polymer or the base polymer, for example, additional crosslinking, re-assembling of fine particles, drying, pulverizing, classifying, etc.

Further, the term "superabsorbent polymer particles" refers to a material in the form of particles obtained by pulverizing the superabsorbent polymer.

A superabsorbent polymer traditionally used is prepared by polymerizing an acrylic acid-based monomer having acidic groups together with a crosslinking agent in the presence of a polymerization initiator, and the superabsorbent polymer thus prepared has no biodegradability to cause environmental problems.

Accordingly, to develop a superabsorbent polymer capable of exhibiting biodegradability, there has been proposed a method of preparing the superabsorbent polymer by copolymerizing an acrylic acid-based monomer with polysaccharide, polyaspartic acid, or polyglutamic acid which is a biodegradable material. However, the method has generated a problem of a poor balance between water retention capacity and absorbency under pressure, which are major physical properties of the superabsorbent polymer.

Accordingly, the present inventors found that when a superabsorbent polymer is prepared by crosslinking polysaccharides by cyclic carboxylic acid anhydride and then further crosslinking the same using an epoxy-based compound, it has excellent biodegradability as well as a good balance between water retention capacity and absorbency under pressure, as compared with biodegradable materials which have been known, thereby completing the present disclosure.

Hereinafter, a biodegradable superabsorbent polymer and a preparation method thereof according to specific embodiments of the present invention will be described in more detail.

Biodegradable Superabsorbent Polymer

A biodegradable superabsorbent polymer according to one embodiment is a biodegradable superabsorbent polymer including a base polymer including a first crosslinked polymer of non-modified or acidic group-containing modified polysaccharides and a first crosslinking agent, in which at least part of the base polymer is crosslinked by a second crosslinking agent. In this regard, the first crosslinking agent includes a cyclic carboxylic acid anhydride, and the second crosslinking agent includes an epoxy-based compound.

First, the biodegradable superabsorbent polymer includes the base polymer including the crosslinked polymer of the polysaccharides and the first crosslinking agent, wherein the base polymer is generally in the form of powder consisting of polymer particles.

Here, the polysaccharide refers to not only a polymeric carbohydrate molecule consisting of a glucose repeating unit, but also a polymeric carbohydrate molecule consisting of a glucosamine repeating unit, in which an amino group is introduced into a hydroxy group bound to the carbon atom at position 2 (C2) of the glucose repeating unit, and/or an N-acetylglucosamine repeating unit, in which an N-acetylamino group is introduced into a hydroxyl group bound to the carbon atom at position 2 (C2) of the glucose repeating unit.

Therefore, the polysaccharide used herein may be understood as a concept encompassing all compounds commonly known as polysaccharides. Examples of the polysaccharide may include starch consisting of glucose repeating units, dextrin which is a hydrolysate of such starch, chitosan consisting of glucosamine repeating units and N-acetylglucosamine repeating units, etc., but are not limited thereto.

More specifically, the polysaccharide may be one or more selected from the group consisting of starch, dextrin, and chitosan.

Further, the polysaccharide constituting the crosslinked polymer of the biodegradable superabsorbent polymer may be a non-modified polysaccharide or an acidic group-containing modified polysaccharide.

Specifically, the non-modified polysaccharide is distinguished from a modified polysaccharide, in which a hydroxyl group (—OH) in the glucose repeating unit constituting the polysaccharide is substituted with another functional group by chemical treatment and/or heat treatment. The superabsorbent polymer including the crosslinked polymer prepared with such a non-modified polysaccharide, as compared to a superabsorbent polymer including a crosslinked polymer prepared with a modified polysaccharide prepared with a polysaccharide substituted with another functional group such as a carboxyl group, may have an advantage in terms of cost reduction during mass production, because of reducing the process steps, and at the same time, reducing the amounts of raw materials.

Further, the acidic group-containing modified polysaccharide is a modified polysaccharide having a structure in which at least one of the hydroxyl groups (—OH) in the glucose repeating unit constituting the polysaccharide is substituted with an acidic group by chemical treatment and/or heat treatment, unlike the non-modified polysaccharide.

The degree of substitution (DS) of the acidic groups in the acidic group-containing modified polysaccharide may be 0.1 to 0.99. When the degree of substitution of the acidic groups is too low, a large amount of unmodified polysaccharides that do not participate in the crosslinking polymerization may remain, and when the degree of substitution of the acidic group is too high, the physical properties of the final superabsorbent polymer may be affected. For example, the degree of substitution (DS) of the acidic groups in the acidic group-containing modified polysaccharide may be 0.4 or more, 0.5 or more, 0.6 or more, or 0.7 or more, and 0.9 or less, 0.8 or less, or 0.75 or less.

Here, the degree of substitution of the acidic groups means the average number of hydroxyl groups (—OH) substituted with acidic groups per glucose repeating unit. In other words, since there are 3 hydroxyl groups per glucose repeating unit, the theoretical maximum degree of substitution is 3. The degree of substitution of 0.1 means that one hydroxyl group is substituted per 10 glucose repeating units. In addition, the degree of substitution of these acidic groups may be calculated through 1H NMR analysis of the modified polysaccharide finally prepared.

Meanwhile, when the acidic group-containing modified polysaccharide includes a carboxyl group, the carboxyl group-containing modified polysaccharide may be prepared by reacting the hydroxyl group of the non-modified polysaccharide with a carboxylic acid or a salt thereof. The carboxylic acid or salt thereof that may be used at this time includes sodium chloroacetate, succinic acid, itaconic acid, etc.

In this regard, the acidic group in the acidic group-containing modified polysaccharide may be a carboxyl group, of which at least part may be neutralized. The degree of neutralization of the acidic groups of the modified polysaccharide may be adjusted depending on the kind of the modified polysaccharide and physical properties of the final superabsorbent polymer to be achieved. For example, in the case of a polysaccharide which is water-insoluble due to its high molecular weight, its solubility in water may be increased by increasing the degree of neutralization from the carboxyl group (COOH) to carboxylate (COO—). Specifically, the degree of neutralization of the modified polysaccharide may be 40 mol % to 95 mol %, or 40 mol % to 80 mol %, or 45 mol % to 75 mol %.

For example, the acidic group-containing modified polysaccharide may be prepared by reacting the non-modified polysaccharide with hydroxide and sodium chloroacetate, and the acidic group-containing modified polysaccharide produced by this reaction is a carboxymethylated polysaccharide. Here, carboxymethylation may occur at the hydroxyl group of the carbon at position 2 (C2), at position 3 (C3), or at position 6 (C6) in anhydroglucose unit (AGU) represented by Chemical Formula A, described below. In other words, the carboxymethylated polysaccharide has a structure in which one or more hydroxyl groups (OH) in the anhydroglucose unit (AGU) are substituted with carboxymethyl groups ($OCH_2COOH/OCH_2COO^-$).

Further, the polysaccharide may have a weight average molecular weight of 10,000 g/mol to 4,000,000 g/mol. When the weight average molecular weight of the polysaccharide is too low, it may be difficult to form a crosslinked polymer exhibiting a strength above a predetermined level, and when the weight average molecular weight of the polysaccharide is too high, the reaction with the first crosslinking agent is difficult due to entanglement of the polymer chains of the high-molecular-weight polysaccharide, and thus sufficient crosslinking may not occur.

Here, the weight average molecular weight (Mw) may be measured by gel permeation chromatography (GPC) using polystyrene (PS) as a standard sample for calibration. More specifically, 200 mg of polysaccharide is diluted in 200 ml of a dimethylformamide (DMF) solvent to prepare about 1000 ppm of a sample, and then the weight average molecular weight may be measured through an RI detector at a flow rate of 1 ml/min using an Agilent 1200 series GPC instrument. In this regard, the molecular weight of the sample may be calculated based on a calibration curve which is obtained using 8 kinds of PS standards.

Further, the polysaccharide may be a starch including amylose and amylopectin at a weight ratio of 1:99 to 50:50, based on the total weight, because it is advantageous in terms of processability and solubility that the content of amylopectin is higher than or equal to the content of amylose. The modified starch may be a modified form of one or more starches of a potato starch, a corn starch, a rice starch, a wheat starch, a tapioca starch, or a sweet potato starch. The potato starch having a high amylopectin content may be more preferred.

Further, the first crosslinking agent may be a cyclic carboxylic acid anhydride. As used herein, the term 'first crosslinking agent', a term used to distinguish it from the second crosslinking agent which is commonly used to crosslink the surface of superabsorbent polymer particles, serves to link the hydroxyl groups of a plurality of polysaccharides to each other. In the above step, the crosslinking occurs regardless of the surface or inside. However, when the additional crosslinking process of the superabsorbent polymer particles is performed, the surface of the superabsorbent polymer particles finally prepared may generally include a structure crosslinked by the second crosslinking agent, and the inside of the superabsorbent polymer particles may generally include a structure crosslinked by the first crosslinking agent. Therefore, the second crosslinking agent mainly serves to crosslink the surface of the superabsorbent polymer, and thus it may be regarded as a surface crosslinking agent. The first crosslinking agent may be, distinguished from the second crosslinking agent, regarded as an internal crosslinking agent.

Here, the cyclic carboxylic acid anhydride refers to a compound having a —(C═O)—O—(C═O)— linkage structure in the ring structure, and is prepared by removing water molecules through a condensation reaction of two carboxylic acids.

Specifically, the cyclic carboxylic acid anhydride may be represented by the following Chemical Formula 1-1 or 1-2:

[Chemical Formula 1-1]

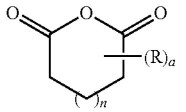

[Chemical Formula 1-2]

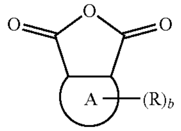

in Chemical Formulae 1-1 and 1-2, n is 0 or 1,

A is cyclohexane; cyclohexene; cyclohexadiene; or a benzene ring which is fused to a neighboring pentacyclic ring, R is halogen, $C_{1-4}$ alkyl, OH, or —($C_{1-4}$ alkylene)-COOH, a is an integer of 0 to 4, and b is an integer of 0 to 6, when a and b are each 2 or more, two or more R's are the same as or different from each other.

For example, R may be fluoro, chloro, bromo, methyl, OH, or -(methylene)-COOH.

Further, a may be 0, 1, or 2, and b may be 0, 1, 2, 3, or 4.

For example, the cyclic carboxylic acid anhydride may be any one selected from the group consisting of the following compounds, but is not limited thereto:

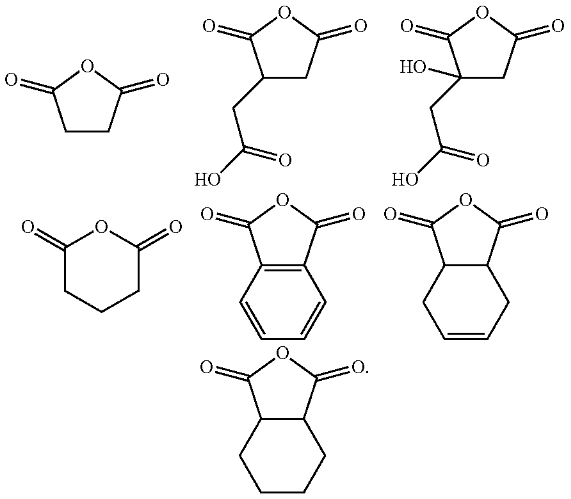

Among them, succinic anhydride or citric anhydride is preferably used as the first crosslinking agent, in terms of ease of use, ease of reaction, and formation of a crosslinked polymer network suitable for retaining water.

Meanwhile, when not cyclic carboxylic acid anhydride, but a crosslinking agent generally used for superabsorbent polymers, such as N',N'-methylenebisacrylamide (MBA), ethylene glycol di(meth)acrylate, ethylene glycol diglycidyl ether, epichlorohydrin, etc., is used as the first crosslinking agent, the crosslinking reaction does not occur, and thus the superabsorbent polymer may not perform its role as a superabsorbent polymer.

In addition, when divinyl sulfone is used as the first crosslinking agent, both the water retention capacity and absorbency under pressure of the superabsorbent polymer finally prepared may be lowered, as compared to the case of using cyclic carboxylic acid anhydride as the first crosslinking agent. The reason is that divinyl sulfone forms a crosslinking by an addition polymerization rather than a condensation reaction, and the non-modified or acidic group-containing modified polysaccharide has a very low reaction possibility of addition polymerization, and therefore, the crosslinking by divinyl sulfone does not sufficiently occur.

For this reason, considering that there is a trade-off relationship between water retention capacity and absorbency under pressure, which are general physical properties of the superabsorbent polymer, it can be seen that the superabsorbent polymer including the base polymer including the crosslinked polymer of polysaccharide and cyclic carboxylic acid anhydride exhibits remarkably improved physical properties, as compared to a superabsorbent polymer including a base polymer including a crosslinked polymer with other crosslinking agents.

Further, the first crosslinking agent may be included in the crosslinked polymer in an amount of 0.01 mole to 50 moles with respect to 1 mole of the polysaccharide. When the content of the first crosslinking agent is too low, crosslinking does not sufficiently occur, and thus it may be difficult to achieve a strength above an appropriate level. When the content of the first crosslinking agent is too high, the internal crosslinking density may increase, making it difficult to achieve a desired water retention capacity. Specifically, the first crosslinking agent may be included in the crosslinked polymer in an amount of 0.05 moles or more, 0.1 mole or more, 0.5 moles or more, 1 mole or more, 5 moles or more, 10 moles, 15 moles or more, or 18 moles or more, and 40 moles or less, 30 moles or less, 25 moles or less, or 20 moles or less with respect to 1 mole of the polysaccharide.

More specifically, the content of the first crosslinking agent may vary depending on whether or not the polysaccharide is modified.

For example, when the superabsorbent polymer includes the crosslinked polymer by the non-modified polysaccharide, the first crosslinking agent may be included in the crosslinked polymer in an amount of 5 moles to 30 moles with respect to 1 mole of the polysaccharide, in order to introduce, into the crosslinked polymer, a carboxyl group (COOH) or carboxylate group (COO—) that enables the securing of absorption performance of the superabsorbent polymer. Specifically, when the superabsorbent polymer includes the crosslinked polymer by the non-modified polysaccharide, the first crosslinking agent may be included in the crosslinked polymer in an amount of 5 moles or more, 10 moles, 15 moles or more, or 18 moles or more, and 30 moles or less, 25 moles or less, or 20 moles or less with respect to 1 mole of the polysaccharide.

On the contrary, when the superabsorbent polymer includes the crosslinked polymer by the modified polysaccharide containing an acidic group such as a carboxyl group, the first crosslinking agent may be included in the crosslinked polymer in an amount of 0.01 mole to 3 moles with respect to 1 mole of the polysaccharide. Specifically, when the superabsorbent polymer includes the crosslinked polymer by the acidic group-containing modified polysaccharide, the first crosslinking agent may be included in the crosslinked polymer in an amount of 0.01 mole or more, 0.05 moles or more, 0.1 mole or more, or 0.5 moles or more, and 3 moles or less, 2 moles or less, 1.5 moles or less, or 1 mole or less with respect to 1 mole of the polysaccharide.

Further, the first crosslinking agent may not include an acrylate-based compound, such as polyethylene glycol (meth)acrylate, polyethylene glycol di(meth)acrylate, propylene glycol di(meth)acrylate, etc., which is commonly used for crosslinking polymerization of an ethylenically unsaturated monomer; an epoxy-based compound such as diepoxybutane, diglycidyl ether, ethylene glycol diglycidyl ether, etc.; divinyl sulfone; or epichlorohydrin, etc.

Accordingly, the crosslinked polymer has a structure, in which the polysaccharides are crosslinked by the first crosslinking agent including cyclic carboxylic acid anhydride, i.e., a three-dimensional network structure, in which the main chains by a plurality of polysaccharides are crosslinked by the ring opening reaction of cyclic carboxylic acid anhydride which is the first crosslinking agent. As described, when the crosslinked polymer has the three-dimensional network structure, water retention capacity and absorbency under pressure, which are general physical properties of the superabsorbent polymer, may be remarkably improved, as compared to the case of having a two-dimensional linear structure which is not further crosslinked by the first crosslinking agent.

More specifically, the polysaccharide includes a glucose repeating unit represented by the following Chemical Formula A. In this regard, the first crosslinking agent may bind to the hydroxyl group of the carbon atom at position 2 (C2), at position 3 (C3), or at position 6 (C6) in the repeating unit.

Generally, the first crosslinking agent binds to the carbon atom at position 6 (C6), because the hydroxyl group bound to the carbon atom at position 6 is more reactive than the hydroxyl group bound to the carbon atom at position 2 or 3. When the polysaccharide includes a glucosamine/N-acetylglucosamine repeating unit, the first crosslinking agent may also bind to the hydroxyl group of the carbon atom at position 6 (C6).

[Chemical Formula A]

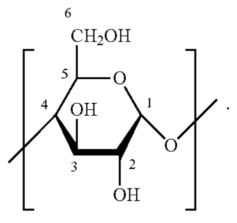

For example, when succinic anhydride is used as the first crosslinking agent, the crosslinked polymer may have a crosslinking structure, as shown in the following Chemical Formula B:

[Chemical Formula B]

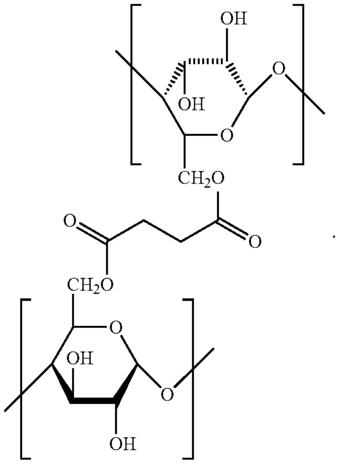

In this case, the polysaccharide is only used as a monomer in the preparation of the crosslinked polymer, and the acrylic acid-based monomer commonly used in the preparation of the superabsorbent polymer may not be used. This is because, when the crosslinked polymer is a crosslinked polymer between the polysaccharide, the acrylic acid-based monomer, and the first crosslinking agent, biodegradability of the superabsorbent polymer may be remarkably reduced due to the crosslinked structure formed by the acrylic acid-based monomer.

Further, the biodegradable superabsorbent polymer has a structure, in which at least part of the base polymer is crosslinked by the second crosslinking agent. Specifically, the structure, in which at least part of the base polymer is crosslinked by the second crosslinking agent, refers to a crosslinked layer which is formed on the base polymer and includes a crosslinked polymer obtained by additionally crosslinking the crosslinked polymer via the second crosslinking agent. Here, the crosslinked layer is mainly formed on at least part of the surface of each particle of the base polymer, and has a structure, in which the crosslinked polymer in the base polymer is crosslinked by the second crosslinking agent. This is to increase the crosslinking density on the surface of the superabsorbent polymer. As described above, when the superabsorbent polymer further includes the structure, in which at least part of the base polymer is crosslinked by the second crosslinking agent, the superabsorbent polymer has a structure, in which the crosslinking density of the outside is higher than that of the inside.

In this regard, an epoxy-based compound is used as the second crosslinking agent, which is advantageous in that crosslinking may occur at a lower temperature, as compared to the case of using an alcohol-based compound commonly used, such as 1,4-butanediol, 1,3-butanediol, 1,5-pentanediol, 1,6-hexanediol, 1,2-cyclohexanedimethanol, etc., as the second crosslinking agent. Specifically, there is a possibility that the polysaccharide compound may be modified at the temperature of crosslinking reaction employing the alcohol-based compound. Therefore, since a crosslinking reaction at a low temperature is required, the epoxy-based compound may be suitable for the crosslinking reaction of the base polymer including the crosslinked polymer of polysaccharide.

More specifically, the epoxy-based compound may be a polyvalent epoxy-based compound or an epihalohydrin-based compound.

For example, the polyvalent epoxy-based compound is a compound containing two or more epoxy groups in its molecule, and may be one or more selected from the group consisting of ethylene glycol diglycidyl ether, diethylene glycol diglycidyl ether, polyethylene glycol diglycidyl ether, propylene glycol diglycidyl ether, tripropylene glycol diglycidyl ether, polypropylene glycol diglycidyl ether, neopentyl glycol diglycidyl ether, 1,6-hexanediol diglycidyl ether, polytetramethylene glycol diglycidyl ether, glycerol diglycidyl ether, glycerol triglycidyl ether, diglycerol polyglycidyl ether, polyglycerol polyglycidyl ether, resorcin diglycidyl ether, 2,2-dibromoneopentyl glycol diglycidyl ether, trimethylolpropane triglycidyl ether, pentaerythritol polyglycidyl ether, sorbitol polyglycidyl ether, adipic acid diglycidyl ester, and phthalic acid diglycidyl ester.

Further, the epihalohydrin-based compound may be one or more selected from the group consisting of epichlorohydrin, epiiodohydrin, epibromohydrin, and 2-(chloromethyl)-2-methyloxirane.

Further, the superabsorbent polymer may be in the form of particles having an average particle size of 150 μm to 850 μm. In this regard, the particle size may be measured according to the European Disposables and Nonwovens Association (EDANA) standard WSP 220.3 method. More specifically, the superabsorbent polymer composition may include about 90% by weight, preferably, 95% by weight or more of the superabsorbent polymer particles having a particle size of about 150 μm to about 850 μm, and less than about 10% by weight, more specifically, less than about 5% by weight of fine particles having a particle size of less than about 150 μm, based on the total weight. When the superabsorbent polymer includes a large amount of the fine particles having a particle size of less than about 150 μm, overall physical properties of the superabsorbent polymer may deteriorate, which is not preferred.

Further, the biodegradable superabsorbent polymer may have a good balance between water retention capacity and absorbency under pressure.

Specifically, the biodegradable superabsorbent polymer may have a water retention capacity (CRC) of 10 g/g to 50 g/g, as measured according to the EDANA method WSP 241.3. For example, the biodegradable superabsorbent polymer may have a water retention capacity (CRC) of 11 g/g or more, 12 g/g or more, 20 g/g or more, 21 g/g or more, or 24 g/g or more, and 40 g/g or less, 35 g/g or less, 30 g/g or less, 25.5 g/g or less, or 25 g/g or less.

Further, the biodegradable superabsorbent polymer may have 0.7 psi absorbency under pressure (AUP) of 5 g/g to 30 g/g, as measured according to the EDANA method WSP 242.3. For example, the biodegradable superabsorbent polymer may have absorbency under pressure (AUP) of 7 g/g or more, 8 g/g or more, 9 g/g or more, 10 g/g or more, 11 g/g or more, 12 g/g or more, 13 g/g or more, 14 g/g or more, or 15 g/g or more, and 25 g/g or less, 23 g/g or less, 20 g/g or less, or 17 g/g or less.

Accordingly, the biodegradable superabsorbent polymer may have an effective capacity (EFFC) of 10 g/g or more, or 10 g/g to 20 g/g, as calculated according to the following Equation 1:

$$\text{Effective capacity } (EFFC) = \{\text{Centrifuge retention capacity } (CRC) + 0.7 \text{ psi Absorbency under pressure } (AUP)\}/2 \quad \text{[Equation 1]}$$

in Equation 1, the centrifuge retention capacity (CRC) means a centrifuge retention capacity (CRC) of the superabsorbent polymer, as measured according to the EDANA method WSP 241.3, and the 0.7 psi absorbency under pressure (AUP) means 0.7 psi absorbency under pressure (AUP) of the superabsorbent polymer, as measured according to the EDANA method WSP 242.3.

For example, the biodegradable superabsorbent polymer may have an effective capacity (EFFC) of 10 g/g or more, 15 g/g or more, 16 g/g or more, 17 g/g or more, or 18 g/g or more, and 20 g/g or less, or 19.5 g/g or less, as calculated by Equation 1.

Further, the biodegradable superabsorbent polymer may have biodegradability of more than 30%, 40% or more, 50% or more, 60% or more, 70% or more, 80% or more, or 90% or more, and 100% or less, as measured according to the ISO 14855-1(2005) standard.

Method of Preparing Biodegradable Superabsorbent Polymer

Meanwhile, the biodegradable superabsorbent polymer may be prepared by a preparation method including the following steps of:

preparing a crosslinked polymer by crosslinking non-modified or acidic group-containing modified polysaccharides in the presence of a first crosslinking agent (step 1);

preparing a base polymer by drying and pulverizing the crosslinked polymer (step 2); and crosslinking at least part of the base polymer in the presence of a second crosslinking agent (step 3), wherein the first crosslinking agent includes a cyclic carboxylic acid anhydride, and the second crosslinking agent includes an epoxy-based compound.

Hereinafter, each step of the method of preparing the superabsorbent polymer according to one embodiment will be described in more detail.

(Step 1)

In the preparation method according to one embodiment, the step 1 is a step of preparing a crosslinked polymer by crosslinking polysaccharides in the presence of a first crosslinking agent. To this end, a first crosslinking solution including the first crosslinking agent and the polysaccharide is prepared.

The crosslinking polymerization occurs by an esterification reaction between the polysaccharides and the first crosslinking agent. Specifically, cyclic carboxylic acid anhydride is ring-opened by a reaction catalyst described below, and then the hydroxyl group of the carbon atom at position 6 (C6) of the glucose repeating unit in the polysaccharide is reacted with the carboxylic acid group of the cyclic carboxylic acid anhydride to form an ester group, and as a result, the polysaccharide is crosslinked by the first crosslinking agent.

In this regard, the first crosslinking agent may be used in an amount of 0.01 mole to 50 moles with respect to 1 mole of the polysaccharide. When the amount of the first crosslinking agent is too low, sufficient crosslinking does not occur, and thus it may be difficult to achieve a strength above an appropriate level. When the amount of the first crosslinking agent is too high, the internal crosslinking density may increase, making it difficult to achieve a desired water retention capacity. Specifically, the first crosslinking agent may be used in an amount of 0.05 moles or more, 0.1 mole or more, 1 mole or more, 5 moles or more, 10 moles, 15 moles or more, or 18 moles or more, and 40 moles or less, 30 moles or less, 25 moles or less, or 20 moles or less with respect to 1 mole of the polysaccharide.

In addition, a catalyst and/or a thermal stabilizer for accelerating the esterification reaction may be additionally used during the crosslinking polymerization.

As the esterification reaction catalyst, 4-dimethylaminopyridine (DMAP), magnesium acetate, tetra-n-butyl titanate (TBT), lead acetate, sodium acetate, potassium acetate, antimony trioxide, N-methyl imidazole, or a combination thereof may be used. The catalyst may be used in an amount of 0.1 mole to 5 moles with respect to 1 mole of the polysaccharide used, in order to shorten the reaction time and to obtain a desired degree of crosslinking. Specifically, the reaction catalyst may be used in an amount of 0.1 mole or more, 0.5 moles or more, 1 mole or more, or 2 moles or more, and 4.5 moles or less, 4 moles or less, or 3.5 moles or less with respect to 1 mole of the polysaccharide.

Further, an organic or inorganic phosphorus compound may be used as the thermal stabilizer. The organic or inorganic phosphorus compound may be, for example, phosphoric acid, an organic ester of phosphoric acid, phosphorous acid, or an organic ester of phosphorous acid. More specifically, as the commercially available heat stabilizer, phosphoric acid, alkyl phosphate, or aryl phosphate may be used.

In addition, the first crosslinking solution may further include additives such as a thickener, a plasticizer, a preservation stabilizer, an antioxidant, etc., as needed.

Further, when the polysaccharide is an insoluble polysaccharide with a high molecular weight, the first crosslinking solution may be in a suspension state. When the polysaccharide is water-soluble, the first crosslinking solution may be in a solution state, in which it is dissolved in a solvent such as water. The solid content, the concentrations of the polysaccharide, the first crosslinking agent, the catalyst, and optionally, the thermal stabilizer in the first crosslinking solution may be appropriately adjusted in consideration of reaction conditions, etc. For example, the solid content in the first crosslinking solution may be 10% by weight to 80% by weight, or 15% by weight to 60% by weight, or 30% by weight to 50% by weight.

When the first crosslinking solution has the above range of solid content, it may be advantageous in controlling the pulverization efficiency during pulverization of the polymer, described below, while eliminating the need to remove polysaccharides that do not participate in the crosslinking reaction using a gel effect phenomenon that occurs in the polymerization reaction of an aqueous solution with a high concentration.

As the solvent applicable at this time, any solvent may be used without limitation in its composition as long as it is able to dissolve the above-mentioned components, and for example, one or more selected from water, ethanol, ethylene glycol, diethylene glycol, triethylene glycol, 1,4-butanediol, propylene glycol, ethylene glycol monobutyl ether, propylene glycol monomethyl ether, propylene glycol monomethyl ether acetate, methyl ethyl ketone, acetone, methyl amyl ketone, cyclohexanone, cyclopentanone, diethylene glycol monomethyl ether, diethylene glycol ethyl ether, toluene, xylene, butyrolactone, carbitol, methyl cellosolve acetate, or N,N-dimethylacetamide may be used in combination.

Meanwhile, the crosslinking reaction of the polysaccharide, i.e., the esterification reaction between the polysaccharide and the first crosslinking agent, may be performed at a temperature of 25 °C to 100 °C for 1 hour to 24 hours. More preferably, the crosslinking reaction of the polysaccharide may be performed at a temperature of 25 °C to 30 °C for 4 hours to 12 hours.

In the step, after the crosslinking reaction of the polysaccharide, a step of precipitating the crosslinked product in a solvent miscible with water may be further included. Through this precipitation process, porosity is provided for the superabsorbent polymer particles, thereby improving absorbency of the superabsorbent polymer.

At this time, prior to the precipitation process, a step of neutralizing the crosslinked product generated by the crosslinking reaction of the polysaccharide to pH of 6 to 8 by mixing with a basic solution may be further performed. Through this step, the carboxyl groups present in the crosslinked product is neutralized to carboxylate groups, and thus the absorption performance of the crosslinked product may be further improved, and the crosslinked product may become neutral so as to be suitable for use as a hygiene product.

Here, the solvent miscible with water means that, even after mixing the solvent with water for a predetermined period of time, for example, after about 5 minutes, 50% or more, or 80% to 100% of the two fluid layers are not separated into separate layers, but maintained as a single layer. For example, as the solvent miscible with water, a lower monohydric alcohol such as methanol, ethanol, propanol, isopropanol, etc.; acetone; 1,4-dioxane, etc. may be used, but is not limited thereto.

The crosslinked polymer thus obtained may be in the form of having several centimeters to several millimeters. Specifically, the size of the obtained crosslinked polymer may vary depending on the concentration and feeding rate of the first crosslinking agent to be fed. Generally, a crosslinked polymer having an average particle size of 2 mm to 50 mm may be obtained.

(Step 2)

Next, the step of preparing a base polymer by drying and pulverizing the crosslinked polymer is performed.

Meanwhile, after the preparation of the crosslinked polymer, a process of coarsely pulverizing the prepared crosslinked polymer may be optionally performed, prior to performing subsequent drying and pulverizing processes.

The coarse pulverizing process is a process for increasing the drying efficiency in the subsequent drying process and controlling the particle size of the superabsorbent polymer powder finally prepared. A pulverizer used herein is not limited to its configuration, specifically, may include any one selected from the group consisting of a vertical pulverizer, a turbo cutter, a turbo grinder, a rotary cutter mill, a cutter mill, a disc mill, a shred crusher, a crusher, a meat chopper, and a disc cutter, but is not limited to the above described examples.

The coarse pulverizing process may be performed such that the crosslinked polymer has a particle size of about 2 mm to about 10 mm. Pulverizing the crosslinked polymer into a particle size of less than 2 mm is technically not easy due to a high water content of the crosslinked polymer, and a phenomenon of agglomeration may occur between the pulverized particles. In contrast, when the crosslinked polymer is pulverized into a particle size of larger than 10 mm, the effect of increasing the efficiency in the subsequent drying step may be insignificant.

Subsequently, the step of preparing the base polymer by drying, pulverizing, and optionally, classifying the crosslinked polymer thus coarsely pulverized is performed.

As the drying method, any drying method may be selected and used without limitation in the constitution as long as it is commonly used in the process of drying the crosslinked polymer. Specifically, the drying step may be performed by a method such as hot air supply, infrared irradiation, microwave irradiation, ultraviolet irradiation, etc.

Specifically, the drying may be performed at a temperature of 100 °C to about 180 °C under vacuum. Meanwhile, the drying may be performed for about 20 minutes to about 90 minutes in consideration of process efficiency, etc., but is not limited thereto.

When the drying step as above is finished, the water content of the polymer may be about 5% by weight to about 10% by weight.

After the drying process, the pulverization process is performed.

The pulverization process may be performed such that the polymer powder, i.e., the base polymer has a particle size of about 150 μm to about 850 μm. A pulverizer used for the pulverization to such a particle size may include, specifically, a pin mill, a hammer mill, a screw mill, a roll mill, a disc mill, a jog mill, etc., but the present invention is not limited to the above-described examples.

Further, after the above pulverization step, a process of classifying the pulverized polymer powder according to the particle size may be further performed in order to manage the physical properties of the superabsorbent polymer to be finally commercialized.

The base polymer obtained from the process may be in the form of a powder including the crosslinked polymer which is crosslinking-polymerized by the non-modified or acidic group-containing modified polysaccharides and the first crosslinking agent. Specifically, the base polymer may be in the form of a powder having a particle size of 150 μm to 850 μm.

(Step 3)

Next, the step of crosslinking at least part of the base polymer in the presence of the second crosslinking agent is performed. In the step, a crosslinked layer, in which the crosslinked polymer included in the base polymer is additionally crosslinked via the second crosslinking agent, may be produced. In other words, superabsorbent polymer particles having the crosslinked layer formed on at least part of the surface of the base polymer particles may be obtained.

The second crosslinking agent used at this time is the same as described above, and may be used in an amount of 0.01 part by weight to 5 parts by weight with respect to 100 parts by weight of the base polymer. When the content of the second crosslinking agent is too low with respect to the base polymer, it is apprehended that absorbency under pressure of the final superabsorbent polymer may be lowered due to insufficient surface modification. On the contrary, when an excessive amount of the second crosslinking agent is used, the basic water retention capacity of the polymer may be deteriorated due to excessive crosslinking reaction, which is not preferred. More specifically, the second crosslinking agent may be used in an amount of 0.02 parts by weight or more, 0.05 parts by weight or more, 0.1 part by weight or more, and 4 parts by weight or less, 3 parts by weight or less, 2 parts by weight or less, 1 part by weight or less, or 0.5 parts by weight or less with respect to 100 parts by weight of the base polymer.

Further, a method of mixing the second crosslinking agent with the base polymer is not limited in view of its construction. A method of feeding the second crosslinking agent and the base polymer powder to a reactor and mixing them with each other, a method of spraying the second crosslinking agent onto the base polymer powder, or a method of mixing the base polymer and the second crosslinking agent while continuously feeding them to a mixer which is continuously operated may be used.

More preferably, the second crosslinking agent may be fed in the form of a second crosslinking solution, in which it may be mixed in a solvent including water. When water is added, there is an advantage in that the second crosslinking agent may be uniformly dispersed in the polymer.

Here, the water to be added is preferably used in an amount of 1 part by weight to 20 parts by weight with respect to 100 parts by weight of the base polymer for the purpose of inducing uniform dispersion of the second crosslinking agent, preventing agglomeration of the polymer particles, and optimizing the surface penetration depth of the second crosslinking agent at the same time. For example, the water may be used in an amount of 1 part by weight or more, 2 parts by weight or more, 3 parts by weight or more, or 4 parts by weight or more, and 10 parts by weight or less, 9 parts by weight or less, 8 parts by weight or less, 7 parts by weight or less, 6 parts by weight or less, or 5 parts by weight or less with respect to 100 parts by weight of the base polymer.

Further, the second crosslinking solution may further include methanol. In particular, water and methanol in the second crosslinking solution may be included at a weight ratio of 60:40 to 40:60. Preferably, water and methanol may be included at a weight ratio of 50:50.

Further, the crosslinking in the step 3 may be performed on the base polymer powder, to which the second crosslinking solution is added, at a temperature of 80 °C to 140 °C. More specifically, the crosslinking in the step 3 may be performed under heat treatment by raising the initial temperature of 20 °C to 80 °C to the maximum temperature of 80 °C to 140 °C for 10 minutes to 30 minutes and keeping the maximum temperature for 5 minutes to 60 minutes.

By satisfying the crosslinking process conditions in the step 3, a superabsorbent polymer appropriately satisfying the physical properties of one embodiment may be more effectively prepared.

A means for raising temperature for the crosslinking of the step 3 is not particularly limited. Heating may be performed by providing a heating medium or by directly providing a heat source. In this regard, the kind of the applicable heating medium may include a hot fluid, etc., such as steam, hot air, or hot oil, but is not limited thereto. The temperature of the heating medium to be provided may be properly selected, taking into consideration the means of the heating medium, the heating rate, and the target temperature. Meanwhile, as the heat source to be directly provided, an electric heater or a gas heater may be used, but is not limited to the above-described examples.

The superabsorbent polymer obtained by the above-described preparation method may maintain excellent absorption performances such as water retention capacity, absorbency under pressure, etc., and may satisfy a more improved absorption rate, etc., thereby satisfying overall physical properties of one embodiment.

Furthermore, provided is an article including the above-described biodegradable superabsorbent polymer.

The article may be one or more selected from absorbent articles, hygiene products, water retaining soil products, water stop materials for the civil engineering and construction, sheets for raising seedling, fresh-keeping agents, materials for poultice, electrical insulators, oral products, dental products, cosmetic products, or skin products.

In this regard, the hygiene products including the superabsorbent polymer may include, for example, paper diapers for children, diapers for adults, sanitary napkins, etc. In particular, the superabsorbent polymer may be preferably applied to diapers for adults, in which secondary odors due to bacterial growth are particularly problematic. Such hygiene products may have the configuration of common hygiene products, except that the above-described superabsorbent polymer of one embodiment is included in an absorber.

Hereinafter, preferred exemplary embodiments are provided for better understanding of the present invention. However, the following exemplary embodiments are only for illustrating the present invention, and the present invention is not limited thereby.

EXAMPLE

Example 1

(Step 1) 100 g of starch (Starch soluble, manufactured by Sigma-Aldrich) as a monomer was dissolved in 5 L of water, and stirred for 10 minutes while raising the temperature to 90 °C. After cooling to room temperature, 240 g of 4-(dimethylamino)pyridine (DMAP) (1.05 equivalents with respect to hydroxyl groups of starch, 3.15 moles with respect to 1 mole of starch) as a catalyst was put and dissolved in a reactor. Thereafter, 1000 g of succinic anhydride (6 equivalents with respect to hydroxyl groups of monomer starch, 18 moles with respect to 1 mole of monomer starch) was added to obtain a first crosslinking solution, which was stirred at room temperature of about 25 °C for 6 hours to perform a crosslinking reaction. After neutralization to pH 7 with a 10% sodium hydroxide solution, the resultant was precipitated in 5 L of methanol to obtain a crosslinked polymer.

(Step 2) Next, the crosslinked polymer was cut to a size of about 5 cm×5 cm, and then put into a meat chopper to pulverize the polymer, and thus gel particle crumbs having a size of 1 mm to 10 mm were obtained. Thereafter, the crumbs were dried in an oven capable of shifting airflow up and down. The crumbs were uniformly dried by flowing hot air at 120 °C or higher from the bottom to the top for 15 minutes and from the top to the bottom for 15 minutes, such that the dried product had a water content of 2% or less.

After drying, the crumbs were pulverized using a pulverizer and then classified into a size of 150 μm to 850 μm to prepare a base polymer.

(Step 3) A second crosslinking solution including 0.1 part by weight of ethylene glycol diglycidyl ether (Denacol® EX-810, manufactured by Nagase ChemteX) as a second crosslinking agent, 4 parts by weight of water, and 4 parts by weight of methanol, based on 100 parts by weight of the base polymer, was sprayed onto the prepared base polymer powder, which was stirred at room temperature so that the second crosslinking solution was evenly distributed on the base polymer powder. Subsequently, the base polymer powder mixed with the second crosslinking solution was put into a crosslinking reactor, and a crosslinking reaction was performed.

It was confirmed that, in the crosslinking reactor, the base polymer powder was gradually heated from the initial temperature of around 80 °C, and it was operated to reach the maximum reaction temperature of 100 °C after 30 minutes. After reaching the maximum reaction temperature, additional reaction was allowed for 15 minutes to obtain a sample of the superabsorbent polymer finally prepared. Thereafter, the sample was classified with a standard mesh sieve of ASTM standard to prepare a superabsorbent polymer of Example 1 having a particle diameter of 150 μm to 850 μm.

Example 2

A superabsorbent polymer was prepared in the same manner as in Example 1, except that chitosan (medium molecular weight, 200-800 cP, 1 wt. % in 1% acetic acid (25 °C, Brookfield), manufactured by Sigma-Aldrich) was used as the monomer, instead of the starch, in Example 1.

Example 3

(Step 1-1) 100 g of starch (Starch soluble, manufactured by Sigma-Aldrich) was dispersed in 300 g of ethanol, and 70 mL of 11.5 M aqueous NaOH solution was added, followed by stirring for 20 minutes. Thereafter, 37.5 g of sodium chloroacetate was added thereto, followed by stirring for 3 hours while heating to 70 °C. After the stirring was completed, the solvent was removed, followed by neutralization with 1 M HCl solution. After washing three times with an ethanol/water 4:1 (weight ratio) solution, ethanol precipitation was performed to synthesize a modified starch precursor containing acidic groups. The synthesized, modified starch precursor containing acidic groups was carboxymethylated starch, and its degree of substitution of carboxymethyl groups was 0.71. At this time, the degree of substitution of the carboxymethyl group of the carboxymethylated starch was set so that the integral sum of the peaks within the data analysis range of 4 ppm to 5.5 ppm in the $^1$H NMR spectrum became 1, and then the degree of substitution of the carbon atoms at positions 2, 3, and 6 was calculated, and the sum of the results was obtained. Here, $^1$H NMR of carboxymethylated starch was obtained as follows: carboxymethylated starch dissolved in $H_2O$ was added to MeOH, followed by stirring, filtering, and drying. The prepared sample was dissolved in 0.75 mL of $D_2O$ and 0.25 mL of $D_2SO_4$ as NMR measurement solvents, which was stirred for 1 hour at 90 °C, followed by measurement.

(Step 1-2) 90 g of the precursor prepared in the step 1-1 was completely dissolved in 150 g of water, 9 g (0.1 mole with respect to 1 mole of the modified starch precursor containing acidic groups) of citric anhydride (2-(3-hydroxy-2,5-dioxotetrahydrofuran-3-yl)acetic acid) was added thereto to obtain a first crosslinking solution, which was stirred at 60 °C for 2 hours to perform a crosslinking reaction, and then heat curing and drying were performed in an oven at 120 °C until all solvents were removed. As a result, a crosslinked polymer was obtained.

Then, the steps 2 and 3 were performed in the same manner as in Example 1 to prepare a superabsorbent polymer of Example 3.

Example 4

A superabsorbent polymer was prepared in the same manner as in Example 1, except that ethylene glycol diglycidyl ether as the second crosslinking agent was used in an amount of 0.02 parts by weight with respect to 100 parts by weight of the base polymer in Example 1.

Example 5

A superabsorbent polymer was prepared in the same manner as in Example 1, except that ethylene glycol diglycidyl ether as the second crosslinking agent was used in an amount of 0.5 parts by weight with respect to 100 parts by weight of the base polymer in Example 1.

Example 6

A superabsorbent polymer was prepared in the same manner as in Example 3, except that succinic anhydride as the first crosslinking agent was used, instead of citric anhydride, in an amount of 3 moles with respect to 1 mole of the monomer modified starch in Example 3.

Example 7

A superabsorbent polymer was prepared in the same manner as in Example 3, except that succinic anhydride as the first crosslinking agent was used, instead of citric anhydride, in an amount of 1 mole with respect to 1 mole of the monomer modified starch in Example 3.

Example 8

A superabsorbent polymer was prepared in the same manner as in Example 3, except that succinic anhydride as the first crosslinking agent was used, instead of citric anhydride, in Example 3.

Example 9

A superabsorbent polymer was prepared in the same manner as in Example 3, except that citric anhydride as the first crosslinking agent was used in an amount of 0.5 moles with respect to 1 mole of the monomer modified starch in Example 3.

Example 10

A superabsorbent polymer was prepared in the same manner as in Example 3, except that citric anhydride as the first crosslinking agent was used in an amount of 0.05 moles with respect to 1 mole of the monomer modified starch in Example 3.

Example 11

A superabsorbent polymer was prepared in the same manner as in Example 1, except that ethylene glycol diglycidyl ether as the second crosslinking agent was used in an amount of 0.05 parts by weight with respect to 100 parts by weight of the base polymer in Example 1.

Example 12

A superabsorbent polymer was prepared in the same manner as in Example 1, except that epichlorohydrin as the second crosslinking agent was used, instead of ethylene glycol diglycidyl ether, in an amount of 0.05 parts by weight with respect to 100 parts by weight of the base polymer in Example 1.

Example 13

A superabsorbent polymer was prepared in the same manner as in Example 3, except that ethylene glycol diglycidyl ether as the second crosslinking agent was used in an amount of 0.05 parts by weight with respect to 100 parts by weight of the base polymer in Example 3.

Example 14

A superabsorbent polymer was prepared in the same manner as in Example 3, except that epichlorohydrin as the second crosslinking agent was used, instead of ethylene glycol diglycidyl ether, in an amount of 0.05 parts by weight with respect to 100 parts by weight of the base polymer in Example 3.

Comparative Example 1

(Step 1) 100 g of starch (Starch soluble, manufactured by Sigma-Aldrich) as a monomer was added to 300 mL of water in a reactor, and stirred for 1 hour while raising the temperature to 90 °C. After cooling to room temperature, a 95% neutralized solution obtained by neutralizing 150 g of acrylic acid with 40% NaOH was added to the reactor. Next, 3.2 g of ammonium persulfate (APS) as a polymerization initiator, and 0.24 g of N',N'-methylenebisacrylamide (MBA) as a first crosslinking agent were added to the reactor to obtain a first crosslinking solution, which was stirred for 4 hours by heating to 65 °C to perform a crosslinking reaction. As a result, a crosslinked polymer was obtained.

Thereafter, the steps 2 and 3 were performed in the same manner as in Example 1 to prepare a superabsorbent polymer of Comparative Example 1.

Comparative Example 2

A superabsorbent polymer was prepared in the same manner as in Example 3, except that divinyl sulfone as the first crosslinking agent was used, instead of citric anhydride, in an amount of 0.05 moles with respect to 1 mole of the monomer modified starch in Example 3.

Experimental Example: Measurement of Physical Properties of Superabsorbent Polymer Physical properties of the superabsorbent polymers prepared in Examples and Comparative Examples were evaluated by the following methods, and shown in Table 1 below. Unless otherwise indicated, all of the following physical properties were evaluated at constant temperature and constant humidity (23±0.5 °C, relative humidity of 45±0.5%). In order to prevent measurement error, the average value of three measurements was used as measurement data. Further, physiological saline or saline used in the following evaluation of physical properties means 0.9% by weight of an aqueous sodium chloride (NaCl) solution.

(1) Centrifuge Retention Capacity (CRC)

The water retention capacity by absorption capacity under no load was measured for each polymer according to EDANA WSP 241.3.

In detail, each superabsorbent polymer $W_0$(g) (about 0.2 g) was put in a nonwoven fabric-made bag, followed by sealing. The bag was immersed in physiological saline (0.9% by weight) at room temperature. After 30 minutes, the bag was dehydrated by using a centrifuge at 250 G for 3 minutes, and then the weight $W_2$(g) of the bag was measured. Further, after carrying out the same operation without using the polymer, the weight $W_1$(g) of the bag was measured. CRC (g/g) was calculated using the obtained weights according to the following Equation:

$$CRC(g/g) = \{[W_2(g) - W_1(g)]/W_0(g)\} - 1 \quad \text{[Equation 1]}$$

(2) Absorbency Under Pressure (AUP)

The absorbency under pressure of 0.7 psi of each polymer was measured according to EDANA WSP 242.3.

In detail, a 400 mesh stainless screen was installed at the bottom of a plastic cylinder having an inner diameter of 60 mm. $W_0$(g) (0.90 g) of the superabsorbent polymer was uniformly scattered on the stainless screen under conditions of room temperature and a humidity of 50%. Then, a piston capable of uniformly providing a load of 0.3 psi was designed so that the outer diameter was slightly smaller than 60 mm and thus it could move freely up and down without any gap with the inner wall of the cylinder. At this time, the weight $W_3$(g) of the device was measured.

A glass filter having a diameter of 90 mm and a thickness of 5 mm was placed in a Petri dish having a diameter of 150 mm, and a physiological saline solution consisting of 0.9% by weight of sodium chloride was poured until the surface level became equal to the upper surface of the glass filter. Then, a sheet of filter paper having a diameter of 90 mm was placed on the glass filter. The measuring device was placed on the filter paper, so that the liquid was absorbed under load for one hour. After one hour, the measuring device was lifted and the weight $W_4$(g) was measured.

Using the respective weights thus obtained, the absorbency under pressure (g/g) was calculated according to the following Equation:

$$AUP(g/g) = [W_4(g) - W_3(g)]/W_0(g) \quad \text{[Equation 2]}$$

(3) Effective Capacity (EFFC)

Based on the centrifuge retention capacity (CRC) and 0.7 psi absorbency under pressure (AUP) thus measured, an effective capacity (EFFC) was calculated by the following Equation 1.

(4) Biodegradability

According to ISO 14855-1 (2005), which is a method of measuring aerobic biodegradability of plastic materials under composting conditions, biodegradability of the superabsorbent polymers prepared in Examples and Comparative Examples was measured using a biodegradability tester (12 Channel Respirometer by ECHO INSTRUMENTS) by a method of quantifying and calculating the amount of carbon dioxide emitted by microorganisms metabolizing each of the superabsorbent polymers. In detail, the composting of each superabsorbent polymer as a test material was carried out for 6 months under composting conditions, and biodegradability was determined as a ratio of the theoretical amount of carbon dioxide generated from the test material to the amount of carbon dioxide actually generated from the test material.

Here, the theoretical generation amount of carbon dioxide and biodegradability are calculated by the following Equation 3 and Equation 4, respectively:

Theoretical generation amount of carbon dioxide [Equation 3]

$$(Th\,CO_2;\ \text{g/container}) = M_{TOT} \times C_{TOT} \times (44/12)$$

in Equation 3, $M_{TOT}$ represents the amount (g) of total dry solids in the test material added to the compost at the start of the test, $C_{TOT}$ represents the ratio (g/g) of organic carbon contained in the total dry solids of the test material, 44 represents the molecular weight of carbon dioxide, and 12 represents the atomic weight of carbon, $$\text{Biodegradability (\%)} = [\{(CO_2)_T - (CO_2)_B\}/Th\,CO_2] \times 100 \quad \text{[Equation 4]}$$

in Equation 4, $(CO_2)_T$ represents the cumulative amount (g/container) of carbon dioxide generated from the composting container, which is contained in the test material, $(CO_2)_B$ represents the mean cumulative amount (g/container) of carbon dioxide generated from the inoculum container, and $ThCO_2$ represents the theoretical generation amount of carbon dioxide (g/container), as calculated through Equation 3.

TABLE 1

| | Monomer | First crosslinking agent (content*) | Second crosslinking agent (content**) | Physical properties of superabsorbent polymer CRC (g/g) | AUP (g/g) | EFFC (g/g) | Biodegradability (%) |
|---|---|---|---|---|---|---|---|
| Example 1 | Starch | Succinic anhydride (18) | Ethylene glycol diglycidyl ether (0.1) | 24 | 15 | 19.5 | >90 |
| Example 2 | Chitosan | Succinic anhydride (18) | Ethylene glycol diglycidyl ether (0.1) | 12 | 8 | 10 | >90 |
| Example 3 | Acidic group-containing modified starch | Citric anhydride (0.1) | Ethylene glycol diglycidyl ether (0.1) | 20 | 14 | 17 | >90 |
| Example 4 | Starch | Succinic anhydride (18) | Ethylene glycol diglycidyl ether (0.02) | 25.5 | 9 | 17.25 | >90 |
| Example 5 | Starch | Succinic anhydride (18) | Ethylene glycol diglycidyl ether (0.5) | 21 | 17 | 19 | >90 |
| Example 6 | Acidic group-containing modified starch | Succinic anhydride (3) | Ethylene glycol diglycidyl ether (0.1) | 22.4 | 14.2 | 18.3 | >90 |
| Example 7 | Acidic group-containing modified starch | Succinic anhydride (1) | Ethylene glycol diglycidyl ether (0.1) | 23.7 | 13.3 | 18.5 | >90 |
| Example 8 | Acidic group-containing modified starch | Succinic anhydride (0.1) | Ethylene glycol diglycidyl ether (0.1) | 27.5 | 9.1 | 18.3 | >90 |
| Example 9 | Acidic group-containing modified starch | Citric anhydride (0.5) | Ethylene glycol diglycidyl ether (0.1) | 19.3 | 15 | 17.15 | >90 |
| Example 10 | Acidic group-containing modified starch | Citric anhydride (0.05) | Ethylene glycol diglycidyl ether (0.1) | 26.9 | 12.1 | 19.5 | >90 |
| Example 11 | Starch | Succinic anhydride (18) | Ethylene glycol diglycidyl ether (0.05) | 24 | 14.2 | 19.1 | >90 |
| Example 12 | Starch | Succinic anhydride (18) | Epichlorohydrin (0.05) | 21.4 | 10.1 | 15.75 | >90 |
| Example 13 | Acidic group-containing modified starch | Citric anhydride (0.1) | Ethylene glycol diglycidyl ether (0.05) | 22 | 11 | 16.5 | >90 |

TABLE 1-continued

| | Monomer | First crosslinking agent (content*) | Second crosslinking agent (content**) | Physical properties of superabsorbent polymer CRC (g/g) | AUP (g/g) | EFFC (g/g) | Biodegradability (%) |
|---|---|---|---|---|---|---|---|
| Example 14 | Acidic group-containing modified starch | Citric anhydride (0.1) | Epichlorohydrin (0.05) | 27 | 13 | 20 | >90 |
| Comparative Example 1 | Starch, acrylic acid | MBA (0.0006) | Ethylene glycol diglycidyl ether (0.1) | 24 | 14 | 19 | 30 |
| Comparative Example 2 | Acidic group-containing modified starch | Divinyl sulfone (0.05) | Ethylene glycol diglycidyl ether (0.1) | 12.2 | 7 | 9.6 | >90 |

(*content of first crosslinking agent: the number of moles with respect to 1 mole of monomer)
(**content of second crosslinking agent: parts by weight with respect to 100 parts by weight of base polymer)

As shown in Table 1, the superabsorbent polymers of Examples, each including the base polymer including the crosslinked polymer in which non-modified or acidic group-containing modified polysaccharides were crosslinked using cyclic carboxylic acid anhydride as the first crosslinking agent, wherein at least part of the base polymer is crosslinked by the second crosslinking agent, exhibited excellent biodegradability without deterioration in the overall physical properties of superabsorbent polymer, such as water retention capacity, absorbency under pressure, etc., as compared to the superabsorbent polymers of Comparative Examples.

Specifically, the superabsorbent polymer of Example 1, prepared by using only the polysaccharide as the monomer, was found to have remarkably improved biodegradability while exhibiting water retention capacity and absorbency under pressure equivalent to those of the superabsorbent polymer of Comparative Example 1, in which the crosslinked polymer was prepared using polysaccharide together with acrylic acid as the monomers.

Furthermore, the superabsorbent polymer of Example 10, including the base polymer including the crosslinked polymer in which acidic group-containing modified polysaccharide monomers were crosslinked using cyclic carboxylic acid anhydride as the first crosslinking agent, wherein at least part of the base polymer is crosslinked by ethylene glycol diglycidyl ether as the second crosslinking agent, was found to exhibit remarkably improved water retention capacity, absorbency under pressure, and effective capacity, as compared to the superabsorbent polymer of Comparative Example 2, prepared by using the same monomer and second crosslinking agent while using divinyl sulfone as the first crosslinking agent.

These results indicate that when the biodegradable superabsorbent polymer is prepared using the non-modified or acidic group-containing modified polysaccharide, overall physical properties of the superabsorbent polymer may vary depending on the kind of the first crosslinking agent. Moreover, the superabsorbent polymer including the crosslinked polymer having a three-dimensional network structure, in which polysaccharides are crosslinked by the ring-opened cyclic carboxylic acid anhydride, at least part of the surface of the crosslinked polymer having a structure crosslinked by the epoxy-based compound, may be suitable as the biodegradable superabsorbent polymer.

The invention claimed is:

1. A biodegradable superabsorbent polymer comprising a base polymer comprising a crosslinked polymer of a polysaccharide and a first crosslinking agent, wherein the polysaccharide is non-modified or modified in which at least one OH group is substituted with an acidic group, wherein at least part of the base polymer is crosslinked by a second crosslinking agent, the first crosslinking agent comprises a cyclic carboxylic acid anhydride, and the second crosslinking agent comprises an epoxy-based compound, wherein the biodegradable superabsorbent polymer has an effective capacity (EFFC) of 10 g/g to 20 g/g, as calculated by Equation 1:

Effective capacity (EFFC)={Centrifuge retention capacity (CRC)+0.7 psi Absorbency under pressure (AUP)}/2 [Equation 1]

in Equation 1, the centrifuge retention capacity (CRC) means a centrifuge retention capacity (CRC) of the superabsorbent polymer, as measured according to EDANA method WSP 241.3, and the 0.7 psi absorbency under pressure (AUP) means 0.7 psi absorbency under pressure (AUP) of the superabsorbent polymer, as measured according to EDANA method WSP 242.3.

2. The biodegradable superabsorbent polymer of claim 1, wherein the polysaccharide is one or more selected from the group consisting of starch, dextrin, and chitosan.

3. The biodegradable superabsorbent polymer of claim 1, wherein the cyclic carboxylic acid anhydride is represented by Chemical Formula 1-1 or 1-2:

[Chemical Formula 1-1]

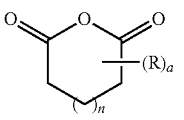

[Chemical Formula 1-2]

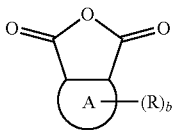

in Chemical Formulae 1-1 and 1-2, n is 0 or 1,

A is cyclohexane, cyclohexene, cyclohexadiene, or a benzene ring, each of which is fused to the neighboring pentacyclic ring, R is halogen, $C_{1-4}$ alkyl, OH, or —($C_{1-4}$ alkylene)-COOH, a is an integer of 0 to 4, and b is an integer of 0 to 6, when a and b are each 2 or more, two or more R's are the same as or different from each other.

4. The biodegradable superabsorbent polymer of claim 1, wherein the cyclic carboxylic acid anhydride is any one selected from the group consisting of the following compounds:

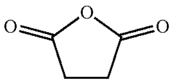
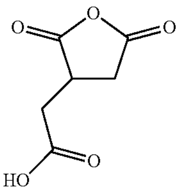
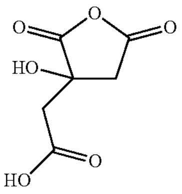
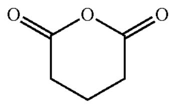
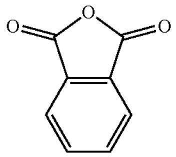
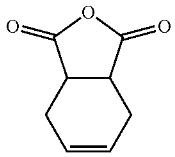
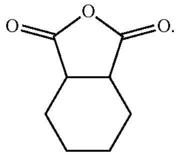

5. The biodegradable superabsorbent polymer of claim 1, wherein the first crosslinking agent is included in the crosslinked polymer in an amount of 0.01 mole to 50 moles with respect to 1 mole of the polysaccharide.

6. The biodegradable superabsorbent polymer of claim 1, wherein the epoxy-based compound is a polyvalent epoxy-based compound or an epihalohydrin-based compound.

7. A method of preparing a biodegradable superabsorbent polymer, the method comprising:

step 1: preparing a crosslinked polymer by crosslinking a polysaccharide in the presence of a first crosslinking agent, wherein the polysaccharide is non-modified or modified in which at least one OH group is substituted with an acidic group;

step 2: preparing a base polymer by drying and pulverizing the crosslinked polymer; and step 3: crosslinking at least part of the base polymer in the presence of a second crosslinking agent, wherein the first crosslinking agent comprises a cyclic carboxylic acid anhydride, and the second crosslinking agent comprises an epoxy-based compound, and wherein after the crosslinking of the polysaccharide, the step 1 further comprises a step of precipitating a crosslinked product in a solvent miscible with water.

8. The method of claim 7, wherein the first crosslinking agent is used in an amount of 0.01 mole to 50 moles with respect to 1 mole of the polysaccharide.

9. The method of claim 7, wherein the crosslinking of the polysaccharide is performed at a temperature of 25 °C to 100 °C.

10. The method of claim 7, wherein the second crosslinking agent is used in an amount of 0.01 part by weight to 5 parts by weight with respect to 100 parts by weight of the base polymer.

11. The method of claim 7, wherein the second crosslinking agent is fed in a form of a second crosslinking solution, in which the second crosslinking agent is mixed in a solvent including water.

12. The method of claim 11, wherein the water is used in an amount of 1 part by weight to 20 parts by weight with respect to 100 parts by weight of the base polymer.

13. The method of claim 11, wherein the second crosslinking solution further comprises methanol.

14. The method of claim 13, wherein the water and the methanol are included at a weight ratio of 60:40 to 40:60.

15. The method of claim 7, wherein the step 3 is performed at a temperature of 80 °C to 140 °C.

16. An article comprising the biodegradable superabsorbent polymer of claim 1.

17. The article of claim 16, wherein the article is one or more selected from absorbent articles, hygiene products, water retaining soil products, water stop materials for the civil engineering and construction, sheets for raising seedling, fresh-keeping agents, materials for poultice, electrical insulators, oral products, dental products, cosmetic products, or skin products.

18. The method of claim 7, prior to the precipitation, further comprising a step of neutralizing the crosslinked product to pH of 6 to 8 by mixing with a basic solution.

19. The biodegradable superabsorbent polymer of claim 1, which has a biodegradability of more than 30% and 100% or less, as measured according to the ISO 14855-1 (2005) standard.

* * * * *